Aug. 23, 1927.  
W. O. WHITE ET AL  
1,640,167  
SPRING MOUNTED COMPASS  
Filed Jan. 20. 1926
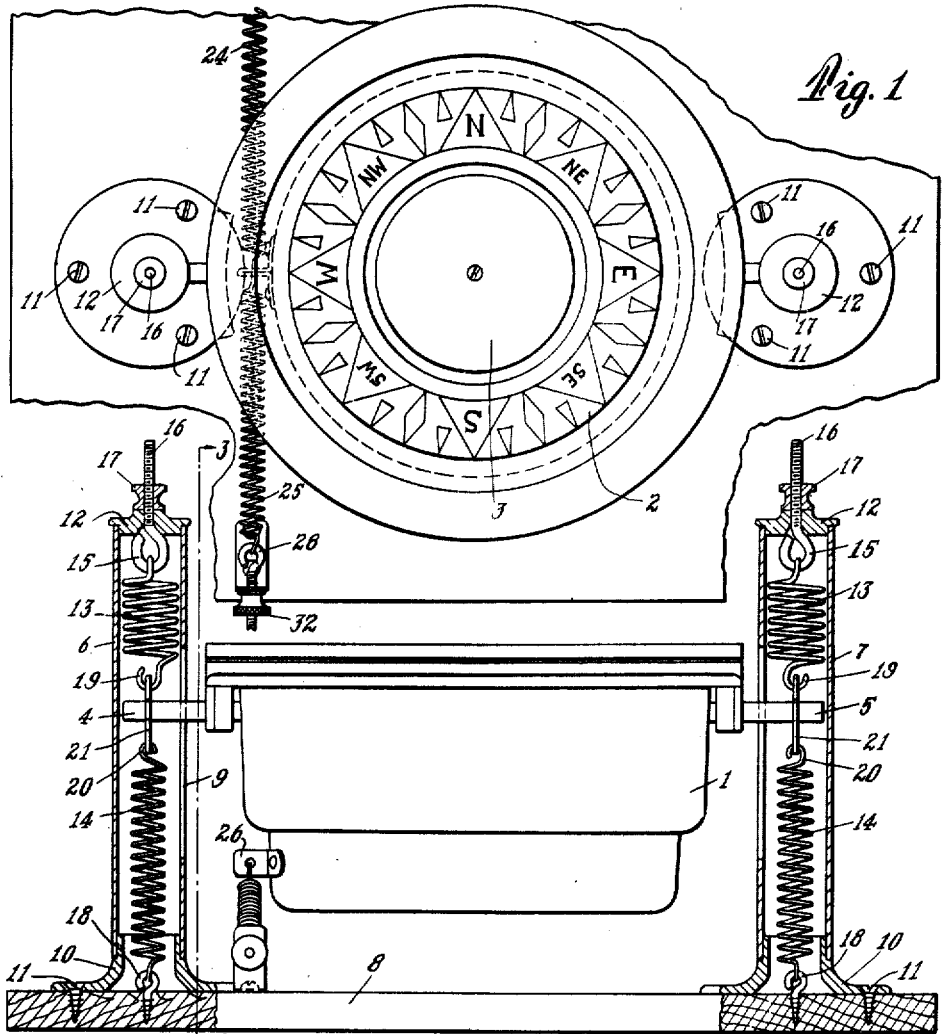
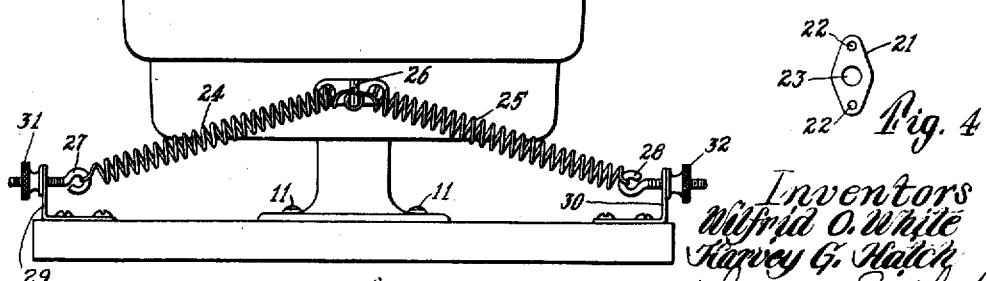
Inventors  
Wilfrid O. White  
Harvey G. Hatch  
by Wright, Brown, Quinby & May  
att'ys.

Patented Aug. 23, 1927.

1,640,167

UNITED STATES PATENT OFFICE.

WILFRID O. WHITE AND HARVEY G. HATCH, OF NEWTON, MASSACHUSETTS, ASSIGNORS TO KELVIN & WILFRID O. WHITE COMPANY, OF BOSTON, MASSACHUSETTS, A CORPORATION OF MASSACHUSETTS.

SPRING-MOUNTED COMPASS.

Application filed June 20, 1926. Serial No. 82,428.

The present invention relates to mariners' compasses, and is particularly concerned with means for mounting such compasses with a resilient suspension and anchorage so that, when applied to fast vessels, such as high speed motor boats and steam vessels, of light draft and displacement, the compass will remain steady when the vessel is traveling rapidly in rough water. Compasses mounted in gimbals, in the ordinary way, upon craft of the sort above mentioned, swing and oscillate so violently when the boat is moving rapidly through choppy water, as to be read with difficulty and are unreliable in their indications. Such boats when operated in the manner and under the conditions indicated, do not roll or pitch through a very wide angle, but such motions of this sort as they do have are rapid, and they strike the waves in quick sucession with great force. This pounding of the boat on the waves, combined with the quick throw due to sudden rolling motion, violently agitates the compass when hung in the ordinary rigidly supported gimbals, and causes the card to swing widely and erratically, making it impossible for the helmsman to steer an accurate compass course. My object in devising the present invention has been to overcome and avoid these difficulties by providing a means for mounting the compass which will absorb the shocks caused in such circumstances by the waves, and leave the compass card undisturbed and steady.

The manner in which the foregoing object is accomplished and the subject matter of which the invention consists are explained in the following specification in connection with a detailed description of a preferred embodiment of the invention.

In the drawings furnished with this specification,—

Fig. 1 shows a plan view of a standard boat compass in connection with a resilient mounting embodying the above mentioned preferred form of the invention;

Fig. 2 is a vertical section of the mounting with the compass, which is shown in side elevation, assembled therewith;

Fig. 3 is a side elevation of the compass as seen from the line 3—3 of Fig. 2;

Fig. 4 is a detail view of a plate which serves both as a bearing for the trunnions of the compass bowl and a connector between the compass and the vibration absorbing springs.

Like reference characters designate the same parts wherever they occur in all the figures.

The reference numeral 1 represents the bowl of a mariner's compass suitable for boats of the character hereinbefore referred to, equipped with the usual pivot and magnetic needles, (not shown), compass card 2 and float 3. It may be assumed that the bowl is filled with liquid for floating the compass and is closed and sealed in a leakage-tight manner, with a transparent crystal or plane in its cover, and containing the usual expansion chamber. In short, my invention involves no change in the compass itself, but is concerned wholly with means for mounting the compass, wherefore that here shown may be considered as representing generically a compass of any type which may be used.

The trunnions 4 and 5 of the compass project through slots in the sides of tubular posts 6 and 7, respectively, mounted on opposite sides of the compass on a base 8 of any suitable character. Such base may be part of a binnacle in which the compass is contained or a portable plate or board, or even a part of the structure of the boat itself.

The tubular posts may be variously constructed, but as here shown are made of sections of tubing, each having a longitudinal slot 9 in one side between its ends and being fitted and secured at its lower end to a pedestal 10, which in turn is suitably fastened to the base plate 8 (in the present instance by screws 11, and having its upper end closed by a plug cap 12 which enters the upper end of the tube freely and has a flange to limit its penetration by bearing on the end of the tube.

In each post is a suspension spring 13 and an anchor spring 14; the former being hung from an eye 15 having a shank 16 which is threaded through the cap, and on the protruding end of which is mounted a lock nut 17. The anchor spring, on the other hand, is secured to the base by a screw eye 18, as here shown, or in any other suitable way, or it may be attached to the lower part of the post instead of to the base. However, by being connected to the base, to which also the post is connected, the anchor spring is connected to the post, although indirectly, at a point below its connection with the compass. These springs are preferably made of wire helices which extend toward, but terminate short of, one another, and their adjacent ends are formed with hooks 19 and 20, respectively, which are engaged with a bearing plate 21. Such bearing plate, as shown in Fig. 1, has holes 22 near its ends to receive the hooked ends of the springs, and a central hole 23 to receive the adjacent compass trunnion; and is the means by which both springs are connected to the trunnion and, through the latter, to the compass.

The lengths and stiffness of the springs and the capacity for adjustment of the supporting eye 15 are made of such values that the springs 13 in the two posts will support the weight of the compass and at the same time put the anchor springs under tension, when assembled and connected, as shown, and that the tension of the springs may be varied as desired, between limits, by adjustment of the supporting eyes. The caps 12, which are freely rotatable on the posts, serve as adjusting nuts by which the springs may be placed under greater or less tension, and the lock nuts 17 secure the adjustments so effected. The arrangement of the springs and associated parts in both posts is the same, and the foregoing description serves equally for either post.

By virtue of the suspension springs, the sudden and violent upward motions caused by the boat striking the waves are absorbed before reaching the compass; while rebound of the compass is diminished and checked yieldingly by the anchorage springs, and swinging of the compass about its trunnions is restrained and all violent swinging movement prevented by springs 24 and 25, which are connected to a lug 26 on the side of the compass bowl at its lower part, and extend to anchoring screw eyes 27 and 28 mounted in brackets 29 and 30 on the base and held by adjustment screws 31 and 32, respectively. It may be understood that the connection lug for the swinging preventer springs is arranged in the same plane with the trunnion axis, or approximately in that plane, and that these springs exert force transversely of such plane and at one side of such axis. With the capacity for adjustment of the various springs herein provided, just that degree of restraint may be opposed to all movements of the compass which may be needed to prevent excessive swinging of the compass card or magnetic needle in any circumstances. The proper balance between flexibility and cushioning effect to absorb shocks and vibrations of the boat, on the one hand, and stiffness to prevent excessive movements, on the other hand, may thus be obtained, with the result that in practice the magnetic needle or needles, and the attached card, remain remarkably steady and deviate remarkably little, even when the boat itself is severely and violently vibrated by striking the waves in rapid succession.

Another function of the adjusting means previously described is to level the compass bowl in circumstances where the supporting structure as a whole may not be perfectly level. In such circumstances, by taking up the supporting eye in one post, possibly also lowering the one in the other post, the trunnion axis may be brought into a horizontal plane.

We have not intended to imply by the foregoing description that this mode of suspension is exclusive of gimbals, but only that in the circumstances described, gimbals are unnecessary and the spring suspension, with provision of the compass bowl to swing about a single horizontal axis, is sufficient. But if desired, we may provide a gimbal ring between the posts and the compass bowl, supporting the gimbal ring in the same way that the bowl as shown here is supported, and hanging the bowl in the ring in the usual way.

Various modifications in the construction and arrangement of the various elements of this invention may be made within the spirit of the invention and scope of protection which we claim for it. For instance, while the springs here shown are all helical wire springs, it is within our contemplation to provide other forms of springs or resilient means equivalent to springs for essentially the same effect as herein described. Hence, the term "spring" is used in this specification with generic meaning to include various forms of yielding and resilient means for exerting and transmitting force. Modifications may likewise be made in the construction of the posts, base, and means for connecting, applying and adjusting the springs or equivalent resilient devices. The term "compass bowl" herein used is intended to typify and include the external part or casing of any compass, however constructed, holding or adapted to hold a compass indicator of any character.

What we claim and desire to secure by Letters Patent is:

1. The combination of a compass bowl having trunnions, hollow posts mounted at opposite sides of said bowl and having longitudinal slots in their sides next to the bowl into which said trunnions project, and supporting springs suspended from the upper parts of said posts and connected to said trunnions to support the bowl.

2. The combination of a compass bowl having trunnions, hollow posts mounted at opposite sides of said bowl and having longitudinal slots in their sides next to the bowl into which said trunnions project, supporting springs suspended from the upper parts of said posts and connected to said trunnions to support the bowl, and anchor springs connected with said trunnions and with the posts below the trunnions.

3. The combination of a compass bowl having trunnions, hollow posts mounted at opposite sides of said bowl and having longitudinal slots in their sides next to the bowl into which said trunnions project, supporting springs suspended from the upper parts of said posts and connected to said trunnions to support the bowl, anchor springs connected with said trunnions and with the posts below the trunnions, and yielding means arranged to resist swinging movement of the bowl about the axis of its trunnions.

4. The combination of a compass, supporting means including hollow rigid posts at opposite sides of the compass, springs suspended from and within said posts and connected to support the compass, anchor springs connected to the compass and to the supporting structure in a manner to exert downward force on the compass, and means mounted on top of said posts for adjusting the tension of said springs.

5. The combination of a compass having a bowl and oppositely extending trunnions, a supporting structure having hollow uprights at each side of said bowl, a supporting spring suspended from each upright, an anchor spring rising toward each supporting spring from a lower part of the supporting structure, and bearing plates receiving said trunnions, each bearing plate being connected to one supporting spring and one anchor spring; said springs and plates being contained within their respective uprights.

6. The combination of a compass having a bowl and oppositely extending trunnions, a supporting structure having uprights at each side of said bowl, a supporting spring suspended from each upright, an anchor spring rising toward each supporting spring from a lower part of the supporting structure, bearing plates receiving said trunnions, each bearing plate being connected to one supporting spring and one anchor spring, and adjusting means applied to one of the springs at each side of the compass for regulating the tension of the opposing anchor and supporting springs; said uprights being constructed to embrace the springs and plates respectively associated therewith.

7. The combination of a compass having a bowl and oppositely extending trunnions, a supporting structure having uprights at each side of said bowl, a supporting spring suspended from each upright, an anchor spring rising toward each supporting spring from a lower part of the supporting structure, bearing plates receiving said trunnions, each bearing plate being connected to one supporting spring and one anchor spring, adjusting means applied to one of the springs at each side of the compass for regulating the tension of the opposing anchor and supporting springs, a lug connected to the lower part of the compass bowl, springs extending from said lug to opposite sides of a plane through the trunnion axis of the bowl, and adjustable anchoring means for said last named springs.

In testimony whereof we have affixed our signatures.

WILFRID O. WHITE.
HARVEY G. HATCH.

having trunnions, hollow posts mounted at opposite sides of said bowl and having longitudinal slots in their sides next to the bowl into which said trunnions project, supporting springs suspended from the upper parts of said posts and connected to said trunnions to support the bowl, and anchor springs connected with said trunnions and with the posts below the trunnions.

3. The combination of a compass bowl having trunnions, hollow posts mounted at opposite sides of said bowl and having longitudinal slots in their sides next to the bowl into which said trunnions project, supporting springs suspended from the upper parts of said posts and connected to said trunnions to support the bowl, anchor springs connected with said trunnions and with the posts below the trunnions, and yielding means arranged to resist swinging movement of the bowl about the axis of its trunnions.

4. The combination of a compass, supporting means including hollow rigid posts at opposite sides of the compass, springs suspended from and within said posts and connected to support the compass, anchor springs connected to the compass and to the supporting structure in a manner to exert downward force on the compass, and means mounted on top of said posts for adjusting the tension of said springs.

5. The combination of a compass having a bowl and oppositely extending trunnions, a supporting structure having hollow uprights at each side of said bowl, a supporting spring suspended from each upright, an anchor spring rising toward each supporting spring from a lower part of the supporting structure, and bearing plates receiving said trunnions, each bearing plate being connected to one supporting spring and one anchor spring; said springs and plates being contained within their respective uprights.

6. The combination of a compass having a bowl and oppositely extending trunnions, a supporting structure having uprights at each side of said bowl, a supporting spring suspended from each upright, an anchor spring rising toward each supporting spring from a lower part of the supporting structure, bearing plates receiving said trunnions, each bearing plate being connected to one supporting spring and one anchor spring, and adjusting means applied to one of the springs at each side of the compass for regulating the tension of the opposing anchor and supporting springs; said uprights being constructed to embrace the springs and plates respectively associated therewith.

7. The combination of a compass having a bowl and oppositely extending trunnions, a supporting structure having uprights at each side of said bowl, a supporting spring suspended from each upright, an anchor spring rising toward each supporting spring from a lower part of the supporting structure, bearing plates receiving said trunnions, each bearing plate being connected to one supporting spring and one anchor spring, adjusting means applied to one of the springs at each side of the compass for regulating the tension of the opposing anchor and supporting springs, a lug connected to the lower part of the compass bowl, springs extending from said lug to opposite sides of a plane through the trunnion axis of the bowl, and adjustable anchoring means for said last named springs.

In testimony whereof we have affixed our signatures.

WILFRID O. WHITE.
HARVEY G. HATCH.

Certificate of Correction.

Patent No. 1,640,167.   Granted August 23, 1927, to

WILFRID O. WHITE ET AL.

It is hereby certified that error appears in the printed specification of the above-numbered patent requiring correction as follows: Page 1, line 70, for the word "plane" read *pane;* and that the said Letters Patent should be read with this correction therein that the same may conform to the record of the case in the Patent Office.

Signed and sealed this 11th day of October, A. D. 1927.

[SEAL.]   M. J. MOORE,
*Acting Commissioner of Patents.*

Certificate of Correction.

Patent No. 1,640,167. Granted August 23, 1927, to

WILFRID O. WHITE ET AL.

It is hereby certified that error appears in the printed specification of the above-numbered patent requiring correction as follows: Page 1, line 70, for the word "plane" read *pane;* and that the said Letters Patent should be read with this correction therein that the same may conform to the record of the case in the Patent Office.

Signed and sealed this 11th day of October, A. D. 1927.

[SEAL.]
M. J. MOORE,
*Acting Commissioner of Patents.*